Aug. 7, 1928.
M. GUETT
1,680,100
SWITCH
Filed Feb. 19, 1927
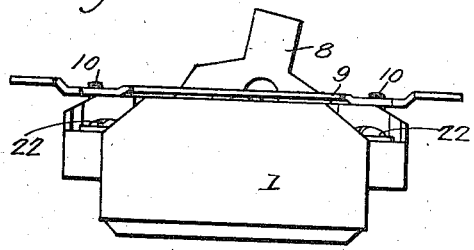
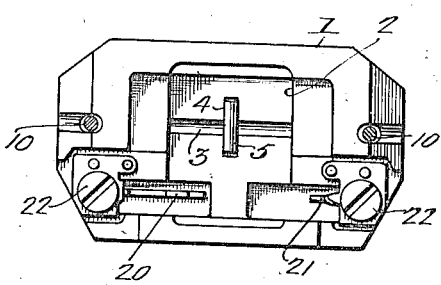
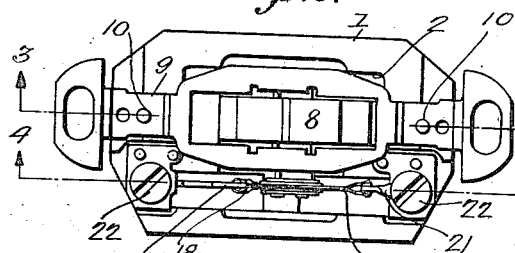
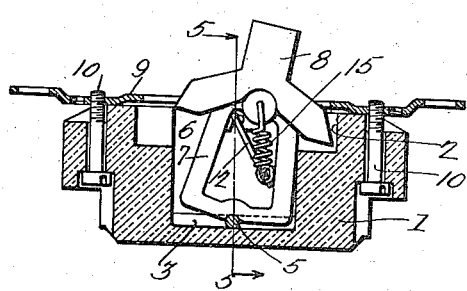
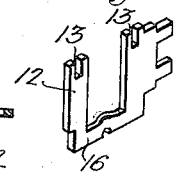
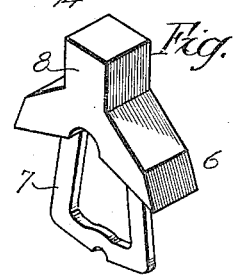
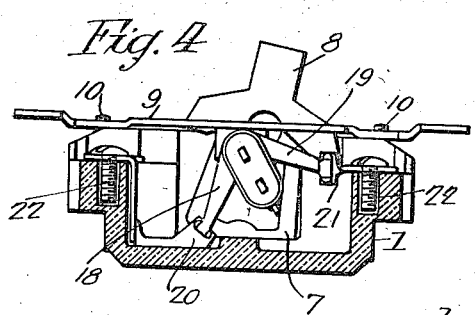
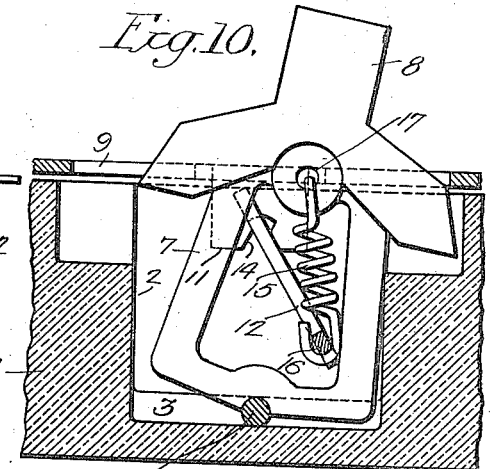
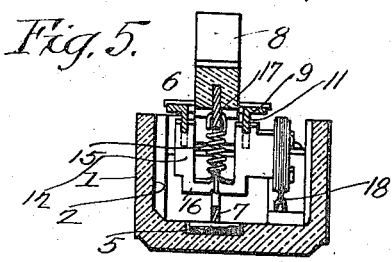
Inventor:
Monroe Guett
by his Attorneys,
Howson & Howson Patented Aug. 7, 1928.

1,680,100

UNITED STATES PATENT OFFICE.

MONROE GUETT, OF HARTFORD, CONNECTICUT, ASSIGNOR TO HART & HEGEMAN MANUFACTURING COMPANY, OF HARTFORD, CONNECTICUT, A CORPORATION OF CONNECTICUT.

SWITCH.

Application filed February 19, 1927. Serial No. 169,518.

This invention relates to certain improvements in snap switches, in which a handled switch-lever actuates, through a spring, the crank on which the blades are mounted.

The object of my invention is to so construct a switch of the type mentioned above that the switch-lever will rock on a bearing in the bottom of the base, while the crank will rock in bearings on the cross-member. The spring that snaps the crank from one position to the other tends to hold the lever and the crank in their bearings.

In the accompanying drawing:

Fig. 1 is a side view of my improved snap switch;

Fig. 2 is a plan view;

Fig. 3 is a longitudinal sectional view on the line 3—3, Fig. 2;

Fig. 4 is a longitudinal sectional view on the line 4—4, Fig. 2;

Fig. 5 is a transverse sectional view on the line 5—5, Fig. 2;

Fig. 6 is a plan view of the base showing the pivot on which the switch-lever rocks;

Fig. 7 is a detached perspective view of the switch-lever;

Fig. 8 is a detached perspective view of the crank;

Fig. 9 is a detached side view of the cross-member; and

Fig. 10 is an enlarged view showing the lever, crank, and connecting spring.

The base 1 of the switch structure can be made of porcelain or other material molded into shape as shown, having a cavity 2 for the switch mechanism.

In the bottom of the cavity in the present instance is a longitudinal groove 3, and at the centre is a transverse groove 4 in which is a round bar 5, preferably of metal, which forms a bearing for the switch-lever 6.

This switch-lever is made as shown in Fig. 7, and has a narrow open framework 7 on which is molded the handle 8 of any form desired having lateral shields, which close the opening in the metallic cross-member 9. The lower portion 7 of the lever extends into the longitudinal groove 3 in the base when in either of its two positions.

The cross-member 9 is secured to the base by screws 10—10 and has openings for the reception of the means for securing the switch structure to a wall or other object.

Depending from the cross-member 9 are two bearings 11—11 for the crank 12. This crank is made as shown in Fig. 8, in the present instance, and has two notches 13 into which extend the bearings 11—11. The bearings have tapered notches 14 into which the crank extends. The crank is U-shaped in the present instance and extends through the open framework of the switch-lever.

A coiled spring 15 connects the cross bar 16 of the crank with the lever, the end of the spring being threaded through an eye 17 in a portion of the lever directly under the handle, as shown in Figs. 3 and 10. The spring is under tension and forces the lever against its bearing in the bottom of the cavity in the base, and forces the crank against its bearings in the cross-member, making a very substantial and simple construction.

On the rocker are two blades 18 and 19, which are insulated from the rocker in the ordinary manner. The blades are so arranged as to engage the terminals 20 and 21 which are secured to the base by screws, the screws 22 forming the binding screws for the wires.

It will be noticed that the spring is in the path of the inside of the switch-lever frame when in either of its two positions. By this arrangement the lever, during the first part of its movement, gives a positive initial movement to the spring and the crank. This insures the movement of the crank on its pivot, after which the spring throws the crank to its other position.

It will be understood that the construction and arrangement of the contact arms and terminals may be modified without departing from the essential features of the invention, and that the bearing for the switch-lever may be formed integral with the base, or the switch-lever may have a projection adapted to a recess in the base.

While the part 12 is termed a crank, it will be understood to cover any form of rocker pivoted in the manner set forth.

I claim:—

1. The combination in a switch structure, of a base having a cavity therein; a pivot bearing at the bottom of the cavity; a member extending across the cavity of the base; a bearing on the cross-member; a switch-lever mounted on the pivot in the cavity of the base; a crank pivotally mounted in the bearing on the cross-member; a spring connected to the lever and the crank and tending to hold the two parts on their respective bearings; blades actuated by the crank; and terminals on the base.

2. The combination in a switch structure, of a base, having a cavity therein; a pivot bearing at the bottom of the cavity; a member extending across the cavity and having a bearing; an open switch lever mounted on the pivot in the cavity of the base; a crank pivotally mounted in the bearing of the cross-member and extending through the open switch-lever; and a spring connecting the two members, the spring and crank being so located that on the first movement of the switch the crank will be given an initial movement, the spring completing the movement.

3. The combination in a switch structure, of a base having a cavity therein; a transverse groove in the bottom of the cavity; a bar in the groove forming a bearing; a cross-member attached to the base and having an opening therein; a switch lever pivotally mounted on the bar and extending through the opening in the cross-member; bearings depending from the cross-member; a U-shaped crank engaging the bearings of the cross-member; a tension spring connected to the switch-lever and the crank, tending to hold both parts to their bearings; blades on the crank; and terminals on the base.

4. The combination in a switch structure, of a base having a bearing therein; a cross-member also having a bearing; a switch-lever mounted on the bearing in the base; a blade-carrying crank mounted in the bearing on the cross-member; and means connecting the two parts.

5. The combination in a switch structure, of a base having a cavity therein, and having a longitudinal and transverse groove in the bottom of the cavity; a pivot bar in the transverse groove; a cross-member secured to the base and having a central longitudinal opening therein and having a depending bearing on each side of said opening; a switch-lever having an open framework and a handle, said lever being pivotally mounted on the bearing in the bottom of the cavity in the base, the handle of the lever extending through the opening in the cross-member; a U-shaped crank extending through the open framework of the lever and mounted on the bearings of the cross-member; a spring connected to the handle end of the lever and to the cross-bar of the U-shaped crank; blades actuated by the crank; and terminals on the base.

6. The combination in a switch structure, of a recessed base; and a switch-lever having a frame-work and a centre bearing at its inner end arranged to rock at the bottom of the recess in the base, said switch lever having a handle on its outer end.

MONROE GUETT.